United States Patent

[11] 3,566,804

| [72] | Inventor | Walter F. Mietla |
| --- | --- | --- |
| | | Dearborn, Mich. |
| [21] | Appl. No. | 781,821 |
| [22] | Filed | Dec. 6, 1968 |
| [45] | Patented | Mar. 2, 1971 |
| [73] | Assignee | Portec Inc. |
| | | Chicago, Ill. |

[54] JACK FOR ADJUSTING CARGO HOLDDOWN APPARATUS
12 Claims, 7 Drawing Figs.

[52] U.S. Cl. ........................................... 105/369,
105/368, 254/95
[51] Int. Cl. ...................................... B61d 45/00,
B60p 7/08, B65i 1/22
[50] Field of Search........................................ 105/368
(T), 369 (A), 368, 369; 280/179, 179.1; 296/1
(A); 248/361, 361 (A); 254/95, 97

[56] References Cited
UNITED STATES PATENTS
| 3,070,042 | 12/1962 | Dunlap | 105/368(T) |
| 3,456,919 | 7/1969 | Snow | 254/95 |

*Primary Examiner*—Drayton E. Hoffman
*Attorney*—Barness, Kisselle, Raisch & Choate ABSTRACT: A rack and pinion type jack having a push-pull implement and bidirectional ratchet for moving cargo tiedown devices along their anchoring rails or channels while such devices are connected to the cargo to thereby tension the cargo securing chains. The jack has a multipurpose framework rendering it compatible with T-beam anchoring rails and also channel type anchoring rails.

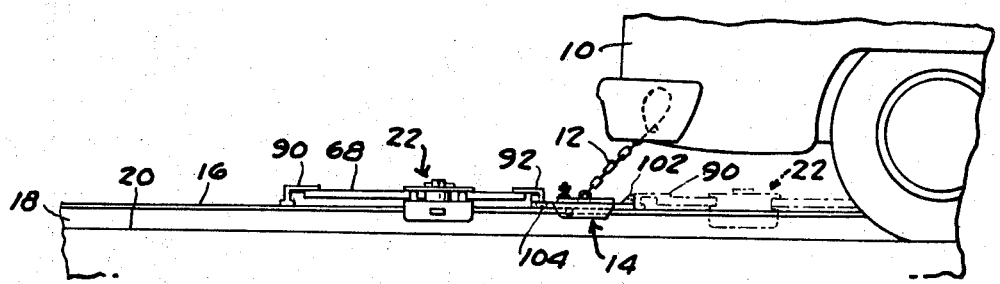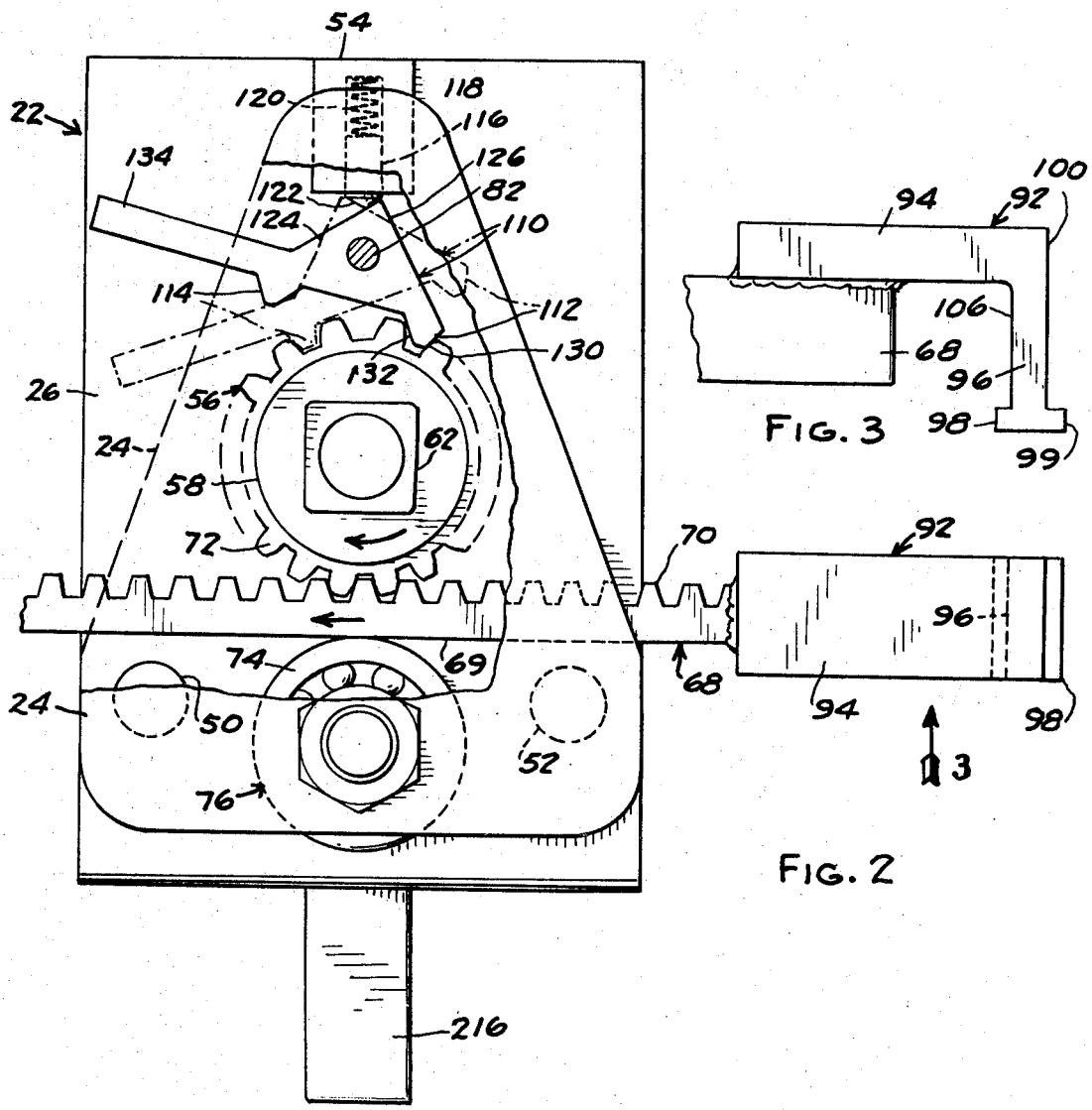

PATENTED MAR 2 1971 3,566,804

INVENTOR.
WALTER F. MIETLA
BY
Barnes, Kisselle, Raisch & Choate
ATTORNEYS

JACK FOR ADJUSTING CARGO HOLDDOWN APPARATUS

This invention relates generally to apparatus for securing cargo to a carrier conveyance, and more particularly to a manually operated jack for applying force to move a cargo holddown device while the same is secured to automotive vehicles to thereby tension the vehicle tiedown chain while positioning the tiedown devices.

A large percentage of the automotive vehicles manufactured today are shipped from the point of final assembly to dealers on specially designed multilevel railway or highway carriers, the vehicles usually being end loaded on the carriers and then arranged on each level thereof in tandem relation. In either type of conveyance, it is necessary to provide vehicle tiedown means capable of reliably securing numerous makes and models of vehicles which vary in length, road clearance and weight.

Hitherto, many types of holddown mechanisms have been provided for the specific purpose of securing automobiles for shipment on multilevel shipping racks mounted on over-length or extra-length railroad flat cars. Most of these holddown mechanisms combine a windlass mechanism with some form of anchoring means. One particularly successful type of holddown apparatus of this type is disclosed in U.S. Pat. No. 3,187,686 wherein the anchoring structure comprises a T-section beam or rail secured to the deck of the vehicle between the wheel tracks thereof. Another type of windlass holddown mechanism is that shown in U.S. Pat. No. 3,038,740 which is of a type adapted to cooperate with a trench-type channel which serves as the anchoring rail.

In order to reduce the vertical dimensions of the holddown apparatus to meet the ever decreasing road clearances of new model automobiles, I have invented a low silhouette tiedown device as set forth in my copending patent application, Ser. No. 781,826, filed Dec. 6, 1968 and assigned to the assignee herein. My tiedown device does not incorporate any windlass mechanism or other chain tensioning structure but rather relies on movement of the tiedown device along the anchoring beam while secured by a chain or the like to the vehicle (the vehicle being held by companion tiedowns secured to the opposite end of the vehicle) to thereby tension the tiedown chain as it pulls the vehicle down on its springs. The tiedown is locked in place when moved a sufficient distance to develop the necessary or requisite tension in the tiedown chain. However, such forcible movement of my tiedown poses a problem for the vehicle loading railroad personnel since it requires a greater force to move the tiedown into an anchoring position under such conditions than can be supplied by direct physical effort of the loading personnel.

Accordingly, it is an object of the present invention to provide an improved force multiplying jack of reliable and inexpensive construction which is versatile and efficient in operation and compatible with different types of cargo holddown devices to facilitate moving holddown devices along their anchoring beams while the same are interconnected with the cargo being secured.

Other objects as well as features and advantages of the present invention will become apparent from the following detailed description taken in conjunction with the accompanying drawings wherein:

FIG. 1 is a fragmentary side elevational view of a portion of an automobile secured by a chain and holddown device mounted on a T-beam rail illustrating the manner in which the low clearance jack of the invention may be used to either push or pull the holddown device along the beam;

FIG. 2 is a fragmentary top plan view of the jack of the invention with a portion broken away to better illustrate details;

FIG. 3 is a fragmentary side elevational view looking in the direction of arrow 3 in FIG. 2 and illustrating the push-pull implement of the jack of the present invention;

Figure 4:
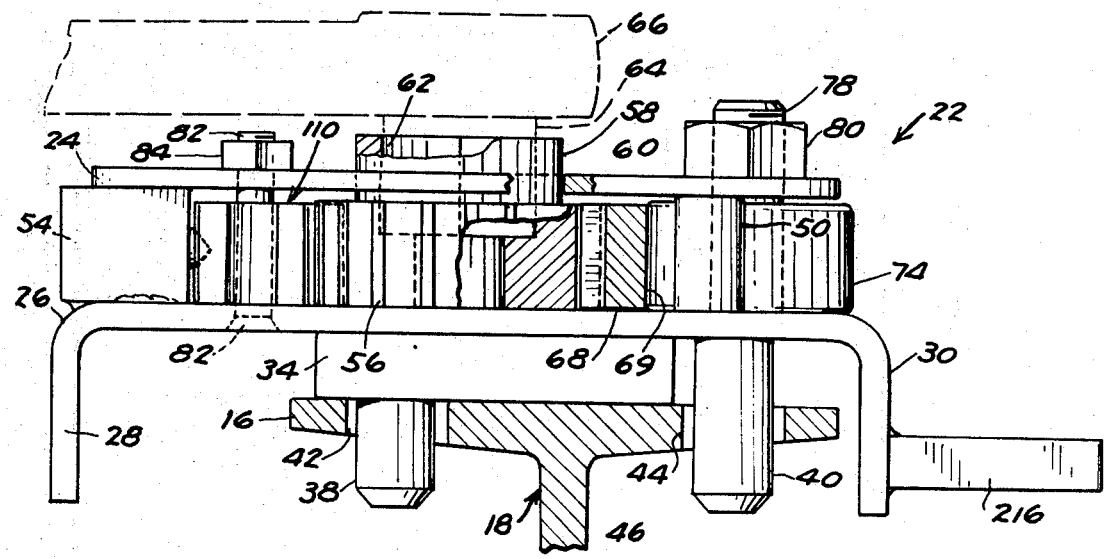
FIG. 4 is an end elevational view of the jack with portions broken away to better illustrate details.

Referring in more detail to the accompanying drawings, FIG. 1 illustrates the lower rear portion of an automobile 10 secured by a chain 12 to a low clearance tiedown device 14 as disclosed in my aforementioned copending application, Ser. No. 781,826, filed Dec. 6, 1968. Tiedown 14 slidably embraces the horizontal flange 16 of a T-section beam or anchor rail 18 which is secured to the deck 20 of a carrier conveyance, such as a shipping rack mounted on the extra-length flat car now in widespread use for transporting automobile vehicles from the point of final assembly to dealers. Briefly, tiedown 14 comprises a frame plate which overlies flange 16 and has side flanges with inwardly extending ears which underlie the flange to restrain the holddown tiedown 14 against the movement in all directions except longitudinally of the T-beam. Tiedown 14 also has a spring-biased locking dog mounted for limited universal movement adjacent the plate and which carries a locking pin inserted by manipulation of the dog through an aperture in the plate for registry in one of the row of T-beam holes to thereby lock tiedown 14 against movement longitudinally of the T-beam. Normally, four such tiedowns and associated chains are used to secure each vehicle, two in front and two in the rear, with one fore and aft pair of tiedowns moveably mounted on one T-beam and the other pair on the adjacent T-beam, the T-beams being spaced laterally apart but within the wheel tracks of deck 20.

In order to secure the vehicle for shipment on the railway car, the two tiedowns are connected at one end of the vehicle by their chains to the vehicle and then moved away from the vehicle to take up the slack in the chains. These two tiedowns are then locked to the T-beam with the chains "hand" tight. Next the tiedowns at the other end of the vehicle are connected thereto by their chains and then moved away from the vehicle to bring these chains hand taut.

In order to snug down the vehicle after the tiedown chains have been connected to the vehicle and to the four tiedowns 14 as described above, a special jack 22 is provided in accordance with the present invention to assist the vehicle loading personnel in applying sufficient force tiedowns 14 to move them into final position, and in so doing to pull vehicle 10 down on its springs to thereby provide a constant tension on the chains so that the vehicle is readily and reliably secured against the bumps, shocks and sway stresses encountered in railway and highway shipment.

Referring to FIGS. 2, 3, 4 and 5, jack 22 has a top plate 24 and a bottom plate 26 rigidly secured together in spaced parallel relation by a structure described hereinafter. Plate 26 is formed as an inverted U-shaped channel section so as to have a pair of spaced parallel dependent flanges 28 and 30 (FIG. 4) spaced apart so as to easily straddle the flange 16 of the T-beam 18 but close enough to one another to pass through the top opening of a trench type anchor channel 32 shown in FIGS. 6 and 7 and described subsequently herein. A pair of spacer blocks 34 and 36 (FIG. 5) are secured to the underside of plate 26, one adjacent each of the opposite longitudinal ends of the plate ("longitudinal" referring to the dimension of plate 26 taken parallel to the lengthwise dimension of the T-beam). Blocks 34 and 36 are adapted to rest flat on the upper surface of flange 16 to support plate 26 spaced above and parallel to flange 16 so that the jack is maintained at the proper elevation for cooperation with the aforementioned tiedown 14, as will become apparent hereinafter.

Figure 5:
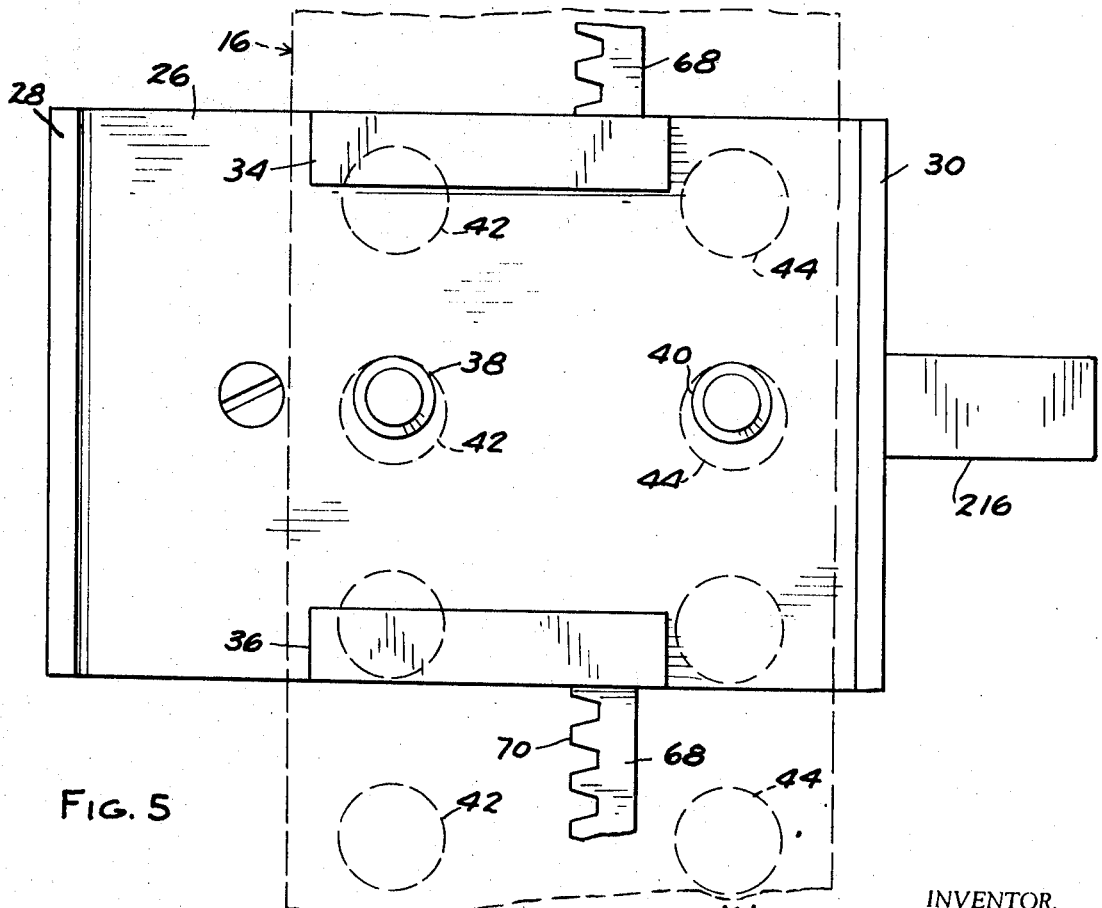
FIG. 5 is a fragmentary bottom plan view of the jack.

Plate 26 has a pair of laterally spaced studs or locking pins 38 and 40 (FIGS. 4 and 5) secured to the underside thereof and projecting perpendicularly therefrom which are adapted to register with a pair of laterally spaced holes 42 and 44 in flange 16 of the T-beam to thereby secure the jack against lengthwise movement when the same is placed on the T-beam. As set forth in the aforementioned U.S. Pat. No. 3,187,686, T- beam 18 has a lengthwise row of the holes 42 punched through the flange between one edge and the center web 46 of the T-beam, and another row of holes 44 between and opposite longitudinal edge and the center web. Holes 42 and 44 are evenly spaced lengthwise of the beam, usually at 3-inch intervals, and are arranged in laterally adjacent pairs as best seen in FIG. 5. Pins 38 and 40 terminate in chamfered ends which preferably are arranged flush with the lower edges of plate flanges 28 and 30.

Plates 24 and 26 are spaced apart by a pair of stationary pins 50 and 52 (FIGS. 2 and 4) disposed near one of the lateral sides of plate 26, and by a spacer block 54 secured between plates 24 and 26 at the opposite lateral edge of plate 26, block 54 being longitudinally centered relative to pins 50 and 52. A pinion gear 56 is disposed with a slight clearance between plates 24 and 26 and is longitudinally centered relative to spacers 50 and 52. Gear 56 is fixed to and supported for rotation with an axle 58 having a circular hub 58 integral with gear 56 which projects through and is journaled in a circular opening 60 in plate 24. The upper end of hub 58 has a square hole 62 adapted to receive the male end 64 of a socket wrench 66 shown in phantom in FIG. 4.

A rack bar 68 extends longitudinally of jack 22 and is captured between plates 24 and 26 with its teeth 70 in mesh with the teeth 72 of gear 56. The smooth backside 69 of rack 68 rolls against the outer race 74 of a bearing assembly 76 which is mounted between the plates by a bolt 78. Bolt 78 is fixed at its lower end to the upper surface of plate 26 and passes through a hole in plate 24, plates 24 and 26 being clamped together on spacer pins 50 and 52 by a nut 80 threaded on bolt 78. A flat head machine bolt 82 on the opposite side of gear 56 passes through a hole in bottom plate 26 and up through a hole in top plate 24, and receives a nut 84 which clamps plate 24 against spacer block 54. Pins 50 and 52 are spaced slightly away from the backside 69 of rack 68 but close enough to serve as guide posts to limit pivoting of the rack in the plane of the drawing of FIG. 2.

Figure 6:
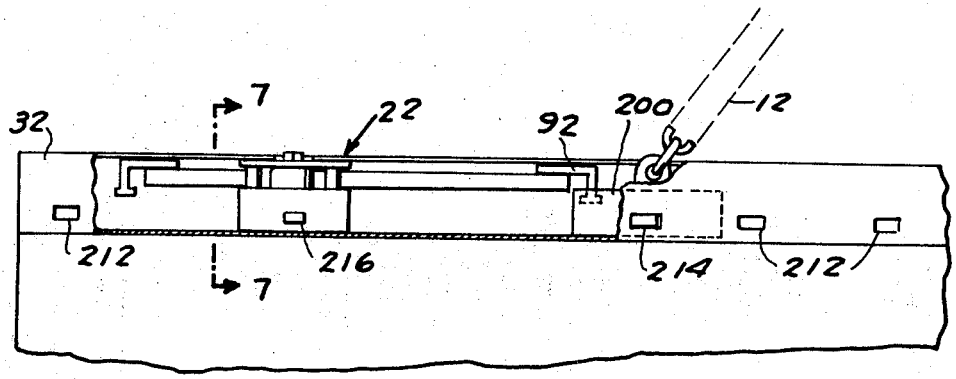
FIG. 6 is a fragmentary side elevational view of a trench type anchor channel and an associated tiedown device illustrating the manner in which my jack is used in conjunction with this different type of cargo holddown apparatus.

As best seen in FIGS. 1 and 6, a pair of identical push-pull implements 90 and 92 are secured to the opposite ends of rack 68 and are mounted in reversed relationship relative to one another. Referring to FIGS. 2 and 3, the push-pull implement 92 is of generally L-shaped configuration with a horizontal arm 94 welded to the upper surface of rack bar 68 so as to project horizontally beyond the end thereof. The free end of arm 94 has an abutment arm 96 dependent therefrom so as to extend downwardly past the underside of bar 68. Bar 96 terminates in a T-head 98 which extends horizontally and is spaced slightly above the upper surface of flange 16 of the T-beam in the mounted position of the jack shown in FIG. 4. The outer face 100 of bar 96 is adapted to abut against the outer face of one or the other of a pair of abutment bars 102 and 104 (FIG. 1) fixed one to each of the opposite ends of tiedown 14. The outwardly protruding lip 99 is adapted to underlie the associated bar 102 or 104 to prevent upward movement of implement 92 when bearing against the tiedown and the jack 22 is operated in the push mode. The inner face 106 of bar 96 is adapted to abut against the inner surface of one or the other of bars 102 and 104 of tiedown 14 when the jack is used in the pull mode, i.e., wherein implement 92 is hooked over the bar as shown in conjunction with bar 104 in FIG. 1 and lip 98 is hooked under the bar to prevent upward movement of the working end of the jack. A notch (not shown) is provided in the opposite ends of the body plate of tiedown 14 to receive lips 98 and 99 in either the push or pull mode of operation explained hereinafter.

Jack 22 has a locking ratchet which permits operation of rack 68 and gears 56 in one direction and locks these parts against movement in the opposite direction, the ratchet being actuatable to reverse its operation, as selected by the operator. Preferably the ratchet comprises a pawl 110 (FIGS. 2 and 4) which is mounted on stud 82 between plates 26 and 24 and between block 54 and gear 56 for pivotal movement between the two extreme positions shown in solid and broken lines in FIG. 2. Pawl 110 has a pair of spaced ratchet teeth 112 and 114 which may alternately be selected for ratchet engagement with teeth 72 of gear 56.

Pawl 110 is yieldably maintained in one or the other of the aforementioned selected positions by a detent 116 preferably in the form of a cylindrical pin slidably received in a blind bore 118 coaxially with a line drawn through the centerline of stud 82 and the axis of gear 56. Pin 116 is biased toward pawl 110 by a coil compression spring 120 trapped in bore 118 between the blind end of the bore and pin 116. The outer end of pin 116 has a tapered or conical point 122 with a vertex angle complementary to the vertex angle defined by intersection of the converging back surfaces 124 and 126 of pawl 110. Thus when pawl 110 is in the solid line position shown in FIG. 2, point 122 bears against surface 124 and tends to rotate pawl 110 clockwise as viewed in FIG. 2, thereby maintaining ratchet tooth 112 against the teeth 72 of gear 56. Due to the inclination of the locking surface 130 of tooth 112 when maintained in this position, gear 56 cannot be rotated counterclockwise as viewed in FIG. 2. However, the more gradual inclination of the opposite surface 132 of tooth 112 permits teeth 72 to cam tooth 112 out of the way when gear 56 is rotated clockwise as viewed in FIG. 2. This camming action rotates pawl 110 counterclockwise and forces pin 116 inwardly against the bias of spring 120. As soon as the gear tooth 72 has passed by tooth 112, detent 116 rotates pawl 110 clockwise to bring tooth 112 back into the space between the next pair of gear teeth.

Pawl 110 has an actuating finger 134 which projects horizontally out beyond the edge of upper plate 24 but terminates short of the lower plate 26 to provide a convenient means for manually flipping pawl 110 to one or the other of its alternate ratchet positions shown in solid and broken lines respectively in FIG. 2. Thus when finger 134 is pushed to rotate pawl 110 counterclockwise from its solid to its broken line position as viewed in FIG. 2, the point of pawl 110 formed at the junction of surfaces 124 and 126 will cam detent pin 116 back into bore 118. When the pawl and detent points are tip to tip, an unstable center position results. When just past this position, pawl surface 126 will bear against the opposite side of detent point 122, whereupon spring 120 will force detent 116 outwardly to bias pawl 110 to its broken line position wherein tooth 114 comes into ratchet relation with the teeth 72 of gear 56. In this alternate reversed position pawl 110 is operable to permit counterclockwise rotation of gear 56 but will prevent clockwise rotation thereof.

In operation, jack 22 can be used either in front of or behind tiedown 14, and can be used to either push or pull it along T-beam 18 as indicated in FIG. 1. Jack 22 may be quickly and easily secured to T-beam 18 by placing spacers 34 and 46 flat on the upper surface of flange 16 with pins 38 and 40 registering in the corresponding pair of laterally spaced T-beam holes 42 and 44 (FIGS. 1 and 4). This locks the jack against movement longitudinally of the T-beam. Jacking of tiedown 14 is done while the tiedown is unlocked and free for longitudinal movement along the T-beam. Jack 22 is operated by inserting the squared male end 64 of a socket wrench 66 in opening 62 and applying torque with the wrench to rotate pinion 56 and thereby drive rack 68 in the desired direction to push or pull tiedown 14 along the T-beam. This normally is done after the tiedown has been connected by a chain to the vehicle so that movement of the tiedown is against the reaction stress exerted by the vehicle spring on the tiedown chain. Hence moving the tiedown along the T-beam serves to pull the vehicle down on its spring so that it will remain reliably secured to the deck of the shipping rack in transit.

After the tiedown has been jacked to the desired position to properly tension the tiedown chain and pull the vehicle sufficiently down on its springs, the tiedown is locked in this adjusted position. Jack 22 may then be disengaged from the T-beam by pivoting the free end of rack 68 upwardly to disengage studs 38 and 40 from the T-beam. Pivoting the jack upwardly in this manner also facilitates manipulation of the engaged end of the rack to unhook it from the tiedown should the same be hooked in the pull mode. Thus one jack may be used to service several tiedowns, and may be used at either end of the tiedown as clearance and available space permits.

Due to the low profile of jack 22, the vertical clearance from the deck of the shipping rack to the top structure of the jack is reduced to a minimum. For example, in a working embodiment of the invention constructed as disclosed and shown to scale therein, this clearance represented only two and one-half inches overall. Thus jack 22 can be conveniently and safely used under low clearance vehicles, and may be left on he T-beam if desired without interferring with such vehicles when driven over the jack.

Another feature of jack 22 is its versatility for use with tiedown 14 on T-beam anchoring rails and also for use with a different type of tiedown and anchoring rail such as the tiedown 200 illustrated in FIG. 6, which is of the type adapted to fit into a trench type anchor channel 32 well-known in the art. Channel 32 is of generally U-shaped cross section with a bottom web 202 secured to the deck 20, a pair of parallel spaced apart upright side flanges 204 and 206, and inwardly turned short flanges 208 and 210 defining therebetween a longitudinally extending top opening through which the tiedown chain 12 extends to its connection with tiedown 200. Side flange 206 has a series of longitudinally spaced openings 212 for receiving an anchoring dog 214 of tiedown 200 therethrough when tiedown 200 is shifted sideways toward flange 206 by a wedge or other mechanism associated with the tiedown. This locks the tiedown 200 against movement longitudinally of the channel, the remaining structure of the channel preventing movement of the tiedown in all other directions. To unlock tiedown 200 from movement along the channel, it is shifted sideways toward flange 204 to withdraw anchoring dog 214 from the flange hole 212.

Figure 7:
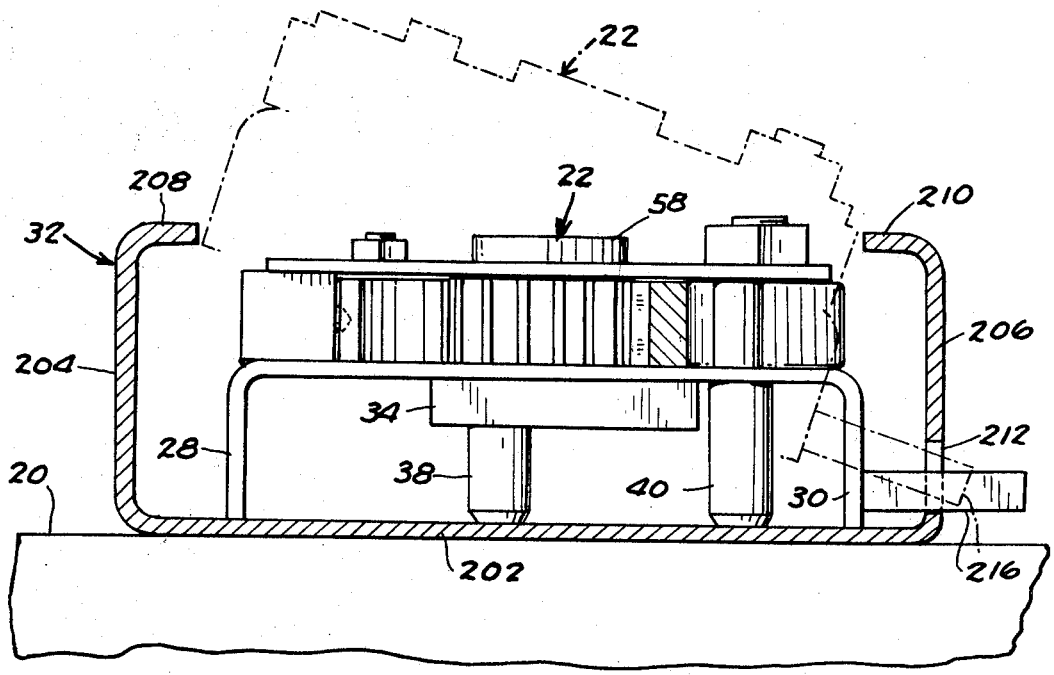
FIG. 7 is a horizontal sectional view taken on the line 7—7 of FIG. 6.

To accommodate this trench type channel 32, jack 22 is provided with a laterally projecting anchoring dog 216 which is secured to flange 30 and projects perpendicularly therefrom parallel to plate 26 above the lower edge of flange 30 at the proper elevation to register with any selected hole 212 when flanges 28 and 30 rest on bottom wall 202 of channel 32 (FIG. 7). As mentioned previously, side flanges 28 and 30 of tiedown 22 are spaced apart slightly less than the distance between channel flanges 208 and 210. Thus jack 22 may be inserted into the top opening of the channel as illustrated in FIG. 7 by first tipping the jack sideways to drop dog 216 into the channel opening, the jack then being manipulated to insert dog 216 through opening 212 as the jack is pivoted about its longitudinal axis back to its normal horizontal operating position as it is dropped onto bottom wall 202 of the channel. Dog 216 is sufficiently long so that should jack 22 be shifted as viewed in FIG. 7 to bring flange 28 against the sidewall 204 of the channel, dog 216 will still not be withdrawn from hole 212. Hence once the jack 22 is inserted in the channel it will be locked in place against longitudinal movement. Jack 22 is withdrawn from the channel by manipulating it in the reverse manner.

Once inserted and locked in the channel, jack 22 is used to either push or pull tiedown 200 in the same manner described previously in connection with tiedown 14. When tiedown 200 has been moved into adjusted position against the stress imposed by the vehicle springs through the tiedown chains, tiedown 200 is locked in place. Then jack 22 is disengaged from the tiedown and removed from the channel to operate on the next tiedown, the jack again being positionable to operate on either end of the tiedown as access and conditions permit.

I claim:

1. A manually operable jack for forcibly moving a vehicle tiedown device in a direction longitudinally along an anchoring member of a vehicle carrier conveyance, said jack comprising a frame, a pinion journaled in said frame for rotation about an axis perpendicular to said longitudinal direction when said frame is disposed in operative position on said anchoring member, a rack extending in said direction through said frame when in said operative position and having teeth in driven engagement with the teeth of said pinion for producing movement of said rack in said direction in response to rotation of said pinion, one end of said rack projecting beyond said frame and having a push-pull implement secured thereto adapted for push-pull engagement with the tiedown device, means for removably supporting said frame on a longitudinally extending surface of the anchor member with said rack extending in said direction at a proper elevation for engagement with the tiedown device and means fixed to said frame and projecting therefrom perpendicular to said direction of movement of said rack adapted for removable insertion in a locking recess of the anchor member for restraining movement of said frame longitudinally of the anchor member, said frame comprising a base plate and a cover plate secured to and spaced parallel from said base plate, said rack and pinion being mounted between said plates, said projecting means comprising a pair of studs extending perpendicular from said base plate from the side thereof remote from said cover plate whereby said jack is adapted for use with a T-beam which constitutes said anchor member by removable insertion of said studs in a pair of laterally spaced holes in the top flange of the T-beam, said base plate comprising a generally U-shaped channel member having downwardly extending first and second side flanges extending at least for the distance of said studs, the center horizontal portion of said base plate having spacer means on the underside thereof adapted to support said base plate spaced above the flange of said T-beam with said rack at the proper elevation for engagement with a tiedown device mounted on said T-beam, said base plate having an anchoring dog secured to said first side flange thereof and projecting laterally outwardly therefrom at the proper elevation for engagement with an anchoring hole in a sidewall of an upwardly open trench type channel anchoring member, said frame being dimensioned to pass through an upper open slot of the channel anchor member, the total lateral dimension from the outer end of said anchoring dog to said second side flange of said base plate being greater than the spacing between the sidewalls of the channel anchor member.

2. A manually operable jack for forcibly moving a vehicle tiedown device in a direction longitudinally along an anchoring member of a vehicle carrier conveyance, said jack comprising a frame, a pinion journaled in said frame for rotation about an axis perpendicular to said longitudinal direction when said frame is disposed in operative position on said anchoring member, a rack extending in said direction through said frame when in said operative position and having teeth in driven engagement with the teeth of said pinion for producing movement of said rack in said direction in response to rotation of said pinion, one end of said rack projecting beyond said frame and having a push-pull implement secured thereto adapted for push-pull engagement with the tiedown device, means for removably supporting said frame on a longitudinally extending surface of the anchor member with said rack extending in said direction at a proper elevation for engagement with the tiedown device, means fixed to said frame and projecting therefrom perpendicular to said direction of movement of said rack adapted for removable insertion in a locking recess of the anchor member for restraining movement of said frame longitudinally of the anchor member, a bidirectional ratchet comprising a pawl having a body portion pivotally mounted adjacent said pinion with a pair of spaced ratchets adapted for selective alternate engagement with said pinion teeth in response to pivotal movement of said body between first and second positions thereof, said body having first and second surfaces on the opposite sides thereof from said pinion teeth converging at an intersection located on a line intersecting the pivot axis of said body and said rotational axis of said pinion when said body is pivoted to an unstable position intermediate said first and second positions, and a spring biased detent having a point with converging faces and aligned for movement on said first-mentioned line for engagement with said body surfaces, said detent engaging one of said surfaces when said body is in said first position and tending to rotate said body in one direction to bring said first tooth into ratcheting relation with the teeth of said pinion, said detent engaging said second surface of said body and tending to rotate said body in the opposite direction to bring said second tooth into ratcheting relation with said pinion when said pinion is rotated in the opposite direction.

3. The jack as set forth in claim 2 wherein said frame comprises a base plate and a cover plate secured to and spaced parallel from said base plate, said rack and pinion being mounted between said plates, said projecting means comprising a pair of studs extending perpendicular from said base plate from the side thereof remote from said cover plate whereby said jack is adapted for use with a T-beam which constitutes said anchor member by removable insertion of said studs in a pair of laterally spaced holes in the top flange of the T-beam, said frame including a backup roller for said rack journaled between said plates for engagement with the side of said rack remote from said teeth thereof.

4. The jack as set forth in claim 3 wherein said plates are spaced apart by first, second and third spacer members extending perpendicularly therebetween, said first and second spacer members being disposed one on each side of said roller adjacent said smooth backside of said rack, said third spacer being disposed longitudinally intermediate said first and second spacer members and on the side of said pinion remote from said rack, said detent being mounted on said third spacer member, and a pair of fastener members extending through said plates to clamp said plates against said spacer members and thereby secure the plates together, one of said fasteners serving as an axle for said roller and the other of said fasteners serving as a pivot pin for said pawl.

5. The jack as set forth in claim 2 wherein said push-pull implement comprises a generally L-shaped member having an arm secured to the upper side of said rack and projecting longitudinally therefrom beyond the end of the rack and an abutment arm dependent from the free end of said longitudinal arm, said abutment arm having a hook portion with oppositely longitudinally extending lips at the free end of said abutment arm.

6. The jack as set forth in claim 5 wherein said rack has an end opposite said one end projecting from the opposite longitudinal end of said frame and a second push-pull implement identical to that described in claim 7 secured to said opposite end of said rack in reversed relation relative to said first push-pull implement.

7. A manually operable jack for forcibly moving a vehicle tiedown device in a direction longitudinally along a flat upwardly facing horizontal surface of an anchoring member of a vehicle carrier conveyance, said jack comprising a frame including a base plate and a cover plate secured to and spaced above and parallel to said base plate, a pinion journaled between said plates for rotation about an axis perpendicular to said plates, means including a hub projecting through said cover plate with means exposed from above said cover plate for applying rotational torque to said pinion, a rack extending through the space between said plates and having teeth in driven engagement with the teeth of said pinion for producing movement of said rack in a direction parallel to the planes of said plates in response to rotation of said pinion, said rack projecting at its opposite free ends beyond said plates and having a push-pull means secured to at least one of said ends adapted for push-pull engagement with the tiedown device, first and second spacer means for removably supporting said frame on said surface of the anchor member with said base plate spaced therefrom and parallel thereto and such that said rack extends parallel to and spaced above said surface at a proper elevation for engagement with the tiedown device and anchoring means fixed to said frame and projecting therefrom perpendicular to said direction of movement of said rack adapted for removable insertion in a locking recess of the anchor member for restraining movement of said frame longitudinally of the anchor member, said anchoring means including a pair of studs extending perpendicularly from said base plate from the side thereof remote from said cover plate whereby said jack is adapted for use with a T-beam which constitutes said anchor member and has a top flange defining said surface, said studs being spaced apart for removable insertion in a pair of laterally spaced holes in the top flange of the T-beam, said first spacer means projecting downwardly from said base plate at least as far as said studs project downwardly from said base plate and being spaced to clear the side edges of said T-beam top flange, said second spacer means projecting downwardly from said base plate a distance less than said studs and being oriented laterally between said first spacer means to rest on said top flange surface when said studs are inserted in anchoring relation in said holes of said top flange.

8. The jack as set forth in claim 7 wherein said first spacer means comprises first and second side flanges extending downwardly from said base plate at least as far as said studs, said anchoring means including an anchoring dog secured to said first side flange thereof and projecting laterally outwardly therefrom at the proper elevation for engagement with an anchoring hole in a sidewall of an upwardly open trench type channel anchoring member, said frame being dimensioned to pass through an upper open slot of the channel anchor member.

9. The jack as set forth in claim 8 including a bidirectional ratchet comprising a pawl having a body portion pivotally mounted adjacent said pinion with a pair of spaced ratchets adapted for selective alternate engagement with said pinion teeth in response to pivotal movement of said body between corresponding first and second positions thereof.

10. The jack as set forth in claim 9 wherein said frame includes a backup roller for said rack journaled between said plates for engagement with the side of said rack remote from said teeth thereof.

11. The jack as set forth in claim 10 wherein said plates are spaced apart by spacer means extending therebetween, and including a pair of fastener members extending through said plates to clamp said plates against said spacer means and thereby secure the plates together, one of said fasteners serving as an axle for said roller and the other of said fasteners serving as a pivot pin for said pawl.

12. The jack as set forth in claim 11 wherein said push-pull means comprises first and second abutment arms, said first arm dependent from said one free end of said rack and said second arm from the other free end of said rack and said second arm from the other free end of said rack, each of said abutment arms having a hook portion with oppositely longitudinally extending lips at the lower free end of said abutment arm, said abutment arms terminating at their lower free ends in a plane disposed slightly above the surface of said top flange when said second spacer means is resting thereon.